US012590848B2

(12) United States Patent
Sung et al.

(10) Patent No.: US 12,590,848 B2
(45) Date of Patent: Mar. 31, 2026

(54) TEMPERATURE SENSOR AND ELECTRONIC SYSTEM FOR EXECUTING TRIMMING OPERATIONS

(71) Applicant: SK hynix Inc., Icheon-si (KR)

(72) Inventors: Hyun Mo Sung, Icheon-si (KR); Yoon Jae Shin, Icheon-si (KR)

(73) Assignee: SK hynix Inc., Icheon-si (KR)

( * ) Notice: Subject to any disclaimer, the term of this patent is extended or adjusted under 35 U.S.C. 154(b) by 360 days.

(21) Appl. No.: 18/330,471

(22) Filed: Jun. 7, 2023

(65) Prior Publication Data

US 2024/0302220 A1 Sep. 12, 2024

(30) Foreign Application Priority Data

Mar. 9, 2023 (KR) ........................ 10-2023-0031304

(51) Int. Cl.
*G01K 7/16* (2006.01)
*G01K 7/01* (2006.01)
(52) U.S. Cl.
CPC ................ *G01K 7/16* (2013.01); *G01K 7/01* (2013.01)
(58) Field of Classification Search
CPC .................................. G01K 7/01; G01K 7/16
See application file for complete search history.

(56) References Cited

U.S. PATENT DOCUMENTS

| | | | | |
|---|---|---|---|---|
| 9,791,327 B2 * | 10/2017 | Rhee | ........................ | G01K 7/01 |
| 2011/0044119 A1 | 2/2011 | Walker | | |
| 2011/0204873 A1 * | 8/2011 | Jeong | ........................ | G01K 7/22 |
| | | | | 324/71.1 |
| 2012/0257648 A1 * | 10/2012 | Jeong | ........................ | G01K 7/00 |
| | | | | 374/163 |
| 2014/0146852 A1 * | 5/2014 | Kim | ........................ | G01K 7/01 |
| | | | | 374/178 |

FOREIGN PATENT DOCUMENTS

KR 1020110097470 A 8/2011

* cited by examiner

*Primary Examiner* — Patrick O Neill
(74) *Attorney, Agent, or Firm* — WILLIAM PARK AND ASSOCIATES LTD.

(57) ABSTRACT

A temperature sensor includes a first trimming resistor having a first resistance value that is trimmed based on a first trimming code and configured to adjust a gate voltage, a MOS transistor turned on based on the gate voltage and configured to drive a variable voltage having a voltage level set for each sensing temperature, and a second trimming resistor connected to the MOS transistor, the second trimming resistor having a second resistance value that is trimmed based on a second trimming code.

19 Claims, 8 Drawing Sheets

| | T_COMP |
|---|---|
| VTEMP $\leqq$ TVREF | 'H' |
| VTEMP > TVREF | 'L' |

TEMPERATURE SENSOR AND ELECTRONIC SYSTEM FOR EXECUTING TRIMMING OPERATIONS

CROSS-REFERENCE TO RELATED APPLICATION

The present application claims priority under 35 U.S.C. § 119 (a) to Korean application number 10-2023-0031304, filed in the Korean Intellectual Property Office on Mar. 9, 2023, the entire disclosure of which is incorporated herein by reference.

BACKGROUND

The present disclosure relates to a temperature sensor and an electronic system for performing trimming operations.

Recently, an electronic system includes a sensor circuit capable of sensing various operating conditions in order to adjust the speed of an internal operation and whether an internal operation has been activated. Operating conditions that are sensed by the sensor circuit may include a temperature and the amount of light. The sensor circuit may include a temperature sensor for generating a temperature sensing signal in response to a temperature and an optical sensor for generating an optical sensing signal in response to the amount of light.

SUMMARY

In an embodiment, a temperature sensor may include a first trimming resistor having a first resistance value that is trimmed based on a first trimming code and configured to adjust a gate voltage, a MOS transistor turned on based on the gate voltage and configured to drive a variable voltage having a voltage level set for each sensing temperature, and a second trimming resistor connected to the MOS transistor, the second trimming resistor having a second resistance value that is trimmed based on a second trimming code.

Furthermore, in an embodiment, a temperature sensor may include a driving voltage regulator configured to drive a driving voltage to a high voltage based on a result of a comparison between a source reference voltage and a voltage generated by dividing the driving voltage, a variable voltage generation circuit including a MOS transistor that drives a variable voltage based on the driving voltage, the variable voltage generation circuit configured to: perform a first trimming operation of adjusting a resistance value of a first trimming resistor in order to adjust a voltage level of a gate voltage of the MOS transistor, and perform a second trimming operation of adjusting a resistance value of a second trimming resistor that is connected to the MOS transistor, and a temperature sensing signal generation circuit configured to generate a temperature sensing signal based on the variable voltage and a temperature reference voltage that is generated by dividing the driving voltage.

Furthermore, in an embodiment, an electronic system may include an external device configured to generate and output a first trimming code and a second trimming code, a logic bit set of each being set based on whether fuses included in the external device have been cut, and a temperature sensor including a MOS transistor that drives a variable voltage based on a driving voltage, the temperature sensor configured to: perform a first trimming operation of adjusting a resistance value of a first trimming resistor based on the first trimming code in order to adjust a voltage level of a gate voltage of the MOS transistor, perform a second trimming operation of adjusting a resistance value of a second trimming resistor that is connected to the MOS transistor based on the second trimming code, and generate a temperature sensing signal based on the variable voltage and a temperature reference voltage.

BRIEF DESCRIPTION OF THE DRAWINGS

FIG. 2 is a circuit diagram of a temperature sensor according to an example of the present disclosure.

FIG. 8 is a table for describing an operation of the temperature sensing signal generation circuit illustrated in FIG. 7.

DETAILED DESCRIPTION

In the descriptions of the following embodiments, the term "preset" indicates that the numerical value of a parameter is previously decided, when the parameter is used in a process or algorithm. According to an embodiment, the numerical value of the parameter may be set when the process or algorithm is started or while the process or algorithm is performed.

Terms such as "first" and "second," which are used to distinguish among various components, are not limited by the components. For example, a first component may be referred to as a second component, and vice versa.

When one component is referred to as being "coupled" or "connected" to another component, it should be understood that the components may be directly coupled or connected to each other or coupled or connected to each other through another component interposed therebetween. In contrast, when one component is referred to as being "directly coupled" or "directly connected" to another component, it should be understood that the components are directly coupled or connected to each other without another component interposed therebetween.

A "logic high level" and a "logic low level" are used to describe the logic levels of signals. A signal having a "logic high level" is distinguished from a signal having a "logic low level." For example, when a signal having a first voltage corresponds to a signal having a "logic high level," a signal having a second voltage may correspond to a signal having a "logic low level." According to an embodiment, a "logic high level" may be set to a voltage higher than a "logic low level." According to an embodiment, the logic levels of signals may be set to different logic levels or opposite logic levels. For example, a signal having a logic high level may be set to have a logic low level in some embodiments, and a signal having a logic low level may be set to have a logic high level in some embodiments.

A "logic bit set" may mean a combination of logic levels of bits included in a signal. When a logic level of each of the bits included in the signal is changed, a logic bit set of the signal may be differently set. For example, if two bits are included in a signal, a logic bit set of the signal may be set as a first logic bit set when logic levels of the two bits included in the signal are a "logic low level" and a "logic low level", and may be set as a second logic bit set when logic levels of the two bits included in the signal are a "logic low level", and a "logic high level."

Hereafter, the present disclosure will be described in more detail through embodiments. The embodiments are only used to exemplify the present disclosure, and the scope of the present disclosure is not limited by the embodiments.

Figure 1:
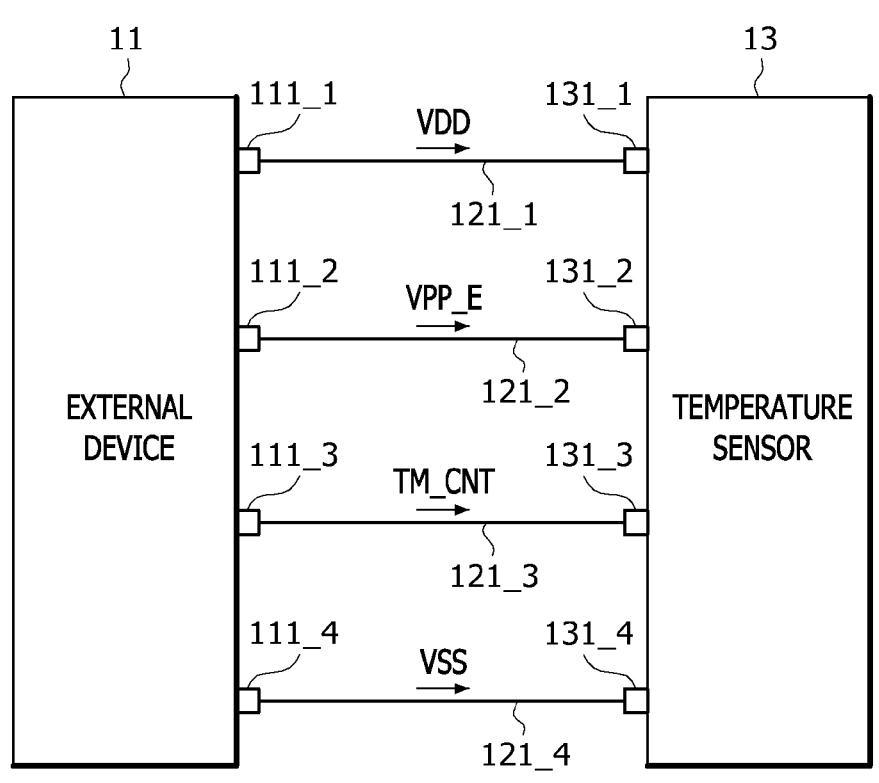
FIG. 1 is a block diagram illustrating a construction of an electronic system according to an example of the present disclosure.

FIG. 1 is a block diagram illustrating a construction of an electronic system 1 according to an example of the present disclosure. As illustrated in FIG. 1, the electronic system 1 may include an external device 11 and a temperature sensor 13.

Figure 5:
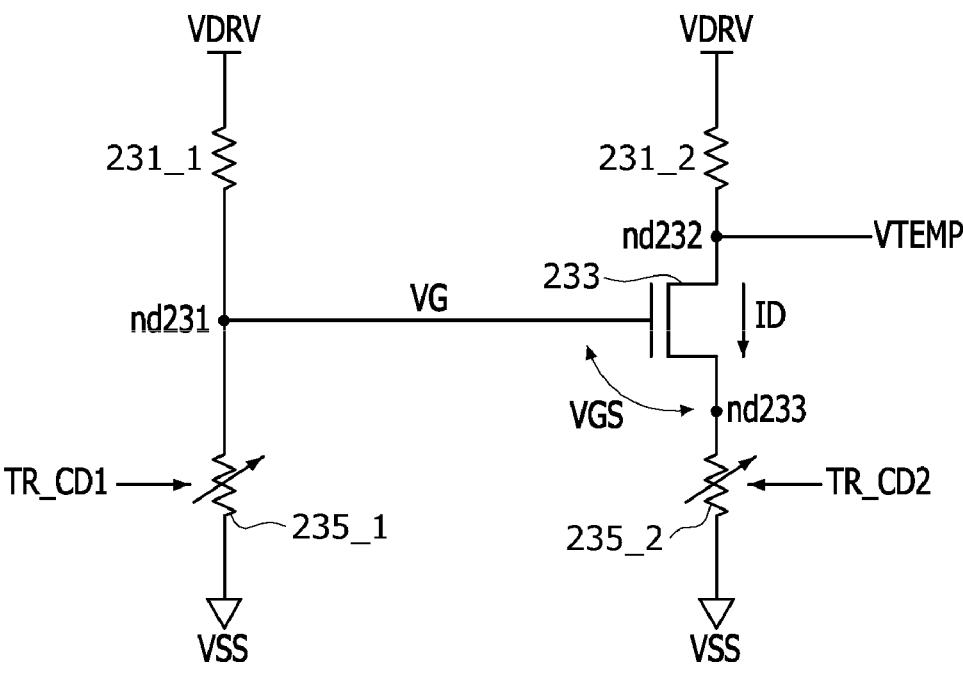
FIG. 5 is a circuit diagram according to an example of a variable voltage generation circuit that is included in the temperature sensor of FIG. 2.

The external device 11 may include a first control pin 111_1, a second control pin 111_2, a third control pin 111_3, and a fourth control pin 111_4. The temperature sensor 13 may include a first sensor pin 131_1, a second sensor pin 131_2, a third sensor pin 131_3, and a fourth sensor pin 131_4. The external device 11 may transmit a power supply voltage VDD to the temperature sensor 13 through a first transmission line 121_1 that is connected between the first control pin 111_1 and the first sensor pin 131_1. The external device 11 may transmit a high voltage VPP_E to the temperature sensor 13 through a second transmission line 121_2 that is connected between the second control pin 111_2 and the second sensor pin 131_2. The voltage level of the high voltage VPP_E may be set at a voltage level that is higher than the voltage level of the power supply voltage VDD. The external device 11 may transmit a trimming control signal TM_CNT to the temperature sensor 13 through a third transmission line 121_3 that is connected between the third control pin 111_3 and the third sensor pin 131_3. For example, referring to both FIGS. 1 and 5, the external device 11 may include multiple fuses (not illustrated) and may set a logic bit set of bits that are included in the trimming control signal TM_CNT based on whether the fuses have been cut. The trimming control signal TM_CNT may include bits for generating a first trimming code TR_CD1 for a first trimming operation and a second trimming code TR_CD2 for a second trimming operation. For example, the external device 11 may set a logic bit set of the first trimming code TR_CD1 based on a logic bit set of some bits, among the bits included in the trimming control signal TM_CNT, and may set a logic bit set of the second trimming code TR_CD2 based on a logic bit set of some other bits, among the bits included in the trimming control signal TM_CNT. The first trimming operation may be performed in a way that a resistance value of a first trimming resistor 235_1 is adjusted by the first trimming code TR_CD1 in order to adjust the voltage level of a gate voltage VG so that an NMOS transistor 233 that drives a variable voltage VTEMP operates in an inversion area. The second trimming operation may be performed in a way that a resistance value of a second trimming resistor 235_2 that is connected to a node nd233 connected to a source terminal of the NMOS transistor 233 is adjusted by the second trimming code TR_CD2. However, a variable voltage generation circuit 27A, illustrated in FIG. 5, is merely an example, and the present disclosure is not limited thereto. For example, the variable voltage generation circuit 27A may be constructed as a circuit capable of linearly adjusting the voltage level of a variable voltage through a trimming operation based on a variable resistor. The external device 11 may transmit a ground voltage VSS to the temperature sensor 13 through a fourth transmission line 121_4 that is connected between the fourth control pin 111_4 and the fourth sensor pin 131_4. The external device 11 may be implemented by a controller (not illustrated) or a test device (not illustrated).

Figure 2:
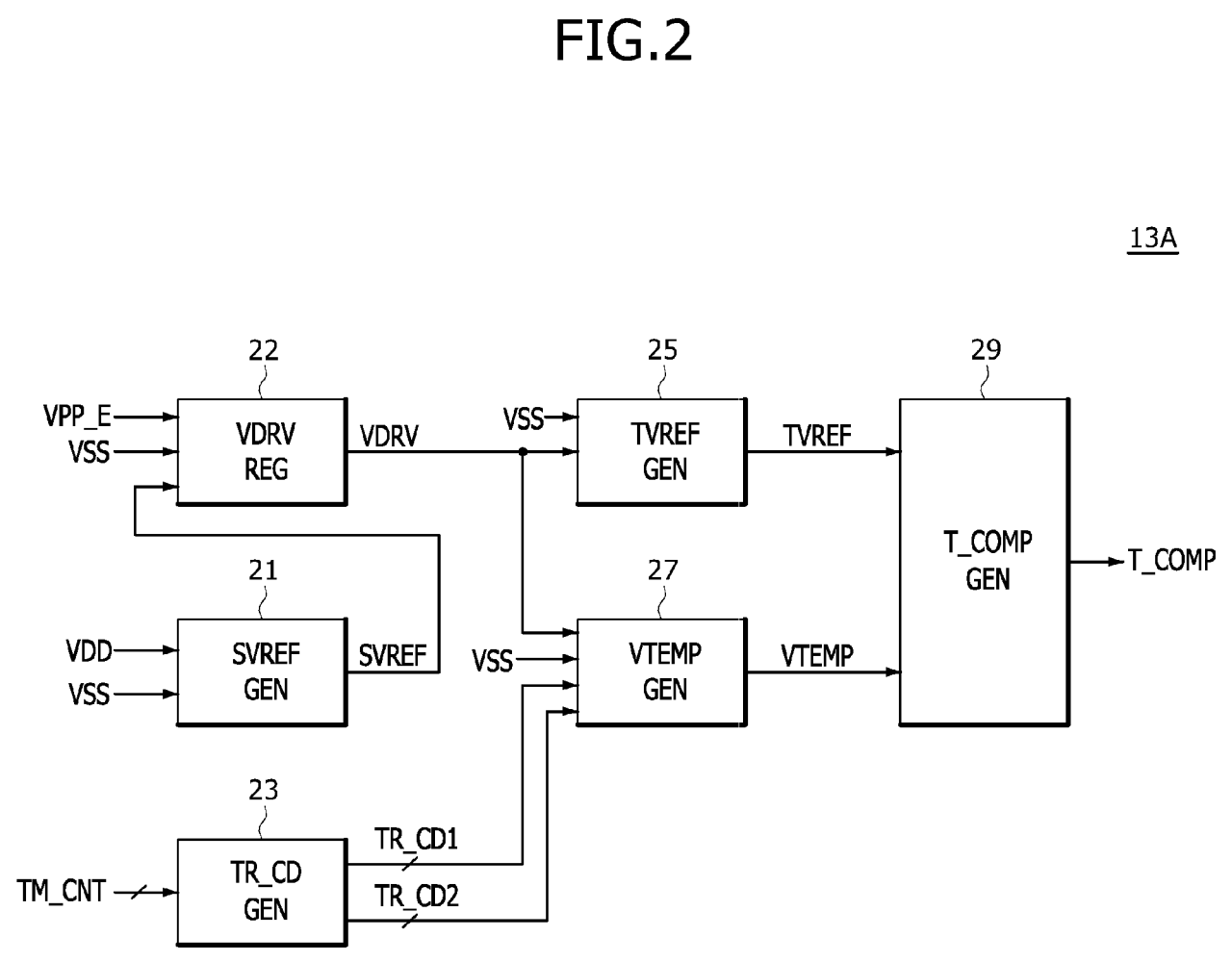

FIG. 2 is a circuit diagram of a temperature sensor 13A according to an example of the temperature sensor 13. As illustrated in FIG. 2, the temperature sensor 13A may include a source reference voltage generation circuit (SVREF GEN) 21, a driving voltage regulator (VDRV REG) 22, a trimming code generation circuit (TR_CD GEN) 23, a temperature reference voltage generation circuit (TVREF GEN) 25, a variable voltage generation circuit (VTEMP GEN) 27, and a temperature sensing signal generation circuit (T_COMP GEN) 29.

The source reference voltage generation circuit 21 may generate a source reference voltage SVREF by being supplied with the power supply voltage VDD and the ground voltage VSS. The source reference voltage generation circuit 21 may include multiple resistor elements (not illustrated) that are connected in series between the power supply voltage VDD and the ground voltage VSS and may generate the source reference voltage SVREF by dividing the power supply voltage VDD based on resistance values of the resistor elements.

The driving voltage regulator 22 may receive the source reference voltage SVREF from the source reference voltage generation circuit 21. The driving voltage regulator 22 may generate a driving voltage VDRV based on the source reference voltage SVREF, the high voltage VPP_E, and the ground voltage VSS. The driving voltage regulator 22 may be implemented with a low drop out (LDO) regulator and may generate the driving voltage VDRV that is set so that a change in the voltage level of the driving voltage VDRV is small. For example, based on a result of a comparison between the source reference voltage SVREF and a voltage generated by dividing the driving voltage VDRV, the driving voltage regulator 22 may generate the driving voltage VDRV in a way to control the driving voltage VDRV to be driven to the high voltage VPP_E. The driving voltage VDRV may be driven to the high voltage VPP_E that has been set to have a higher voltage level than the power supply voltage VDD so that the voltage level of the driving voltage VDRV can be set at a preset voltage level rapidly and stably.

The trimming code generation circuit 23 may generate the first trimming code TR_CD1 and the second trimming code TR_CD2 based on a trimming control signal TM_CNT. The trimming code generation circuit 23 may generate the first trimming code TR_CD1 and the second trimming code TR_CD2, the logic bit set of each being determined based on a logic bit set of bits that are included in the trimming control signal TM_CNT. For example, the trimming code generation circuit 23 may set the logic bit set of the first trimming code TR_CD1 based on a logic bit set of some bits, among bits included in the trimming control signal TM_CNT, and may set a logic bit set of the second trimming code TR_CD2 based on a logic bit set of some other bits, among the bits included in the trimming control signal TM_CNT.

The temperature reference voltage generation circuit 25 may receive the driving voltage VDRV from the driving voltage regulator 22. The temperature reference voltage generation circuit 25 may generate a temperature reference voltage TVREF by being supplied with the driving voltage VDRV and the ground voltage VSS. The temperature reference voltage generation circuit 25 may include multiple resistor elements (221_1 to 221_L in FIG. 4) that are connected in series between the driving voltage VDRV and the ground voltage VSS and may generate the temperature reference voltage TVREF by dividing the driving voltage VDRV based on resistance values of the resistor elements (221_1 to 221_L in FIG. 4).

The variable voltage generation circuit 27 may receive the driving voltage VDRV from the driving voltage regulator 22 and may receive the first trimming code TR_CD1 and the second trimming code TR_CD2 from the trimming code generation circuit 23. Based on the driving voltage VDRV, the ground voltage VSS, the first trimming code TR_CD1, and the second trimming code TR_CD2, the variable voltage generation circuit 27 may perform the first trimming operation and the second trimming operation and may generate the variable voltage VTEMP. The first trimming operation may be performed in a way that a resistance value of the first trimming resistor (235_1 in FIG. 5) is adjusted by the first trimming code TR_CD1 in order to adjust the voltage level of the gate voltage (VG in FIG. 5) so that the NMOS transistor (233 in FIG. 5) that drives the variable voltage (VTEMP in FIG. 5) operates in the inversion area. The second trimming operation may be performed in a way that a resistance value of the second trimming resistor (235_2 in FIG. 5) that is connected to the node (nd233 in FIG. 5) that is connected to the source terminal of the NMOS transistor (233 in FIG. 5) is adjusted by the second trimming code TR_CD2. In response to the second trimming operation, the variable voltage generation circuit 27 may adjust the gate voltage (VG in FIG. 5) by the first trimming resistor (235_1 in FIG. 5), the resistance value of which is trimmed in response to the first trimming operation, and may generate the variable voltage VTEMP that is driven to the driving voltage VDRV by the NMOS transistor (233 in FIG. 5) that is turned on by the gate voltage (VG in FIG. 5) in the state in which the resistance value of the second trimming resistor (235_2 in FIG. 5) has been adjusted. The variable voltage generation circuit 27 may generate the variable voltage VTEMP, the voltage level of which is linearly changed for each sensing temperature. The sensing temperature may be defined as a temperature surrounding the place at which the temperature sensor 13A is disposed.

The temperature sensing signal generation circuit 29 may receive the temperature reference voltage TVREF from the temperature reference voltage generation circuit 25 and may receive the variable voltage VTEMP from the variable voltage generation circuit 27. The temperature sensing signal generation circuit 29 may generate a temperature sensing signal T_COMP based on the temperature reference voltage TVREF and the variable voltage VTEMP. For example, the temperature sensing signal generation circuit 29 may generate the temperature sensing signal T_COMP having a logic level set at a first logic level when the temperature reference voltage TVREF has a lower voltage level than the variable voltage VTEMP and may generate the temperature sensing signal T_COMP having a logic level set at a second logic level when the temperature reference voltage TVREF has a voltage level equal to or higher than the variable voltage VTEMP. The temperature sensing signal T_COMP may be generated based on the variable voltage VTEMP having an improved characteristic in which the variable voltage VTEMP is linearly changed in response to a change in the sensing temperature. Accordingly, the matching of the temperature sensing signal T_COMP can be improved, and a characteristic of various internal operations that are controlled by the temperature sensing signal T_COMP can be improved. For example, since the temperature sensing signal T_COMP is generated at a preset sensing temperature, timing of internal operations that need to be performed for each sensing temperature can be accurately set.

Figure 3:
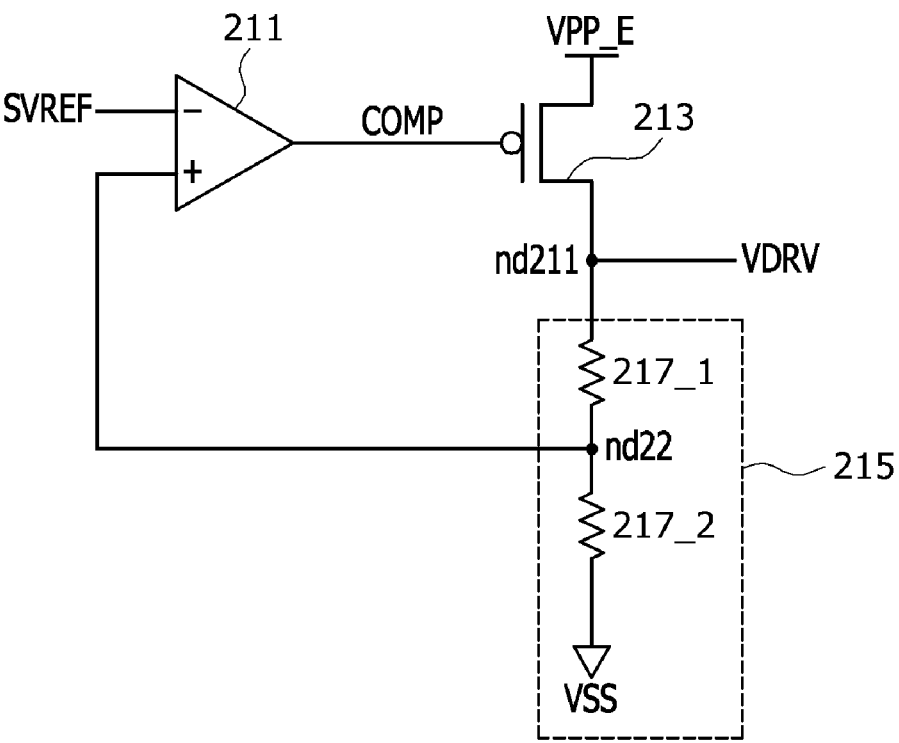
FIG. 3 is a circuit diagram according to an example of a driving voltage regulator that is included in the temperature sensor of FIG. 2.

FIG. 3 is a circuit diagram of a driving voltage regulator 22A according to an example of the driving voltage regulator 22. As illustrated in FIG. 3, the driving voltage regulator 22A may include a comparator 211, a driving element 213, and a voltage divider 215. The comparator 211 may generate a comparison pulse COMP by comparing the source reference voltage SVREF with a voltage divided by the voltage divider 215. The comparator 211 may generate the comparison pulse COMP having a logic low level when the voltage divided by the voltage divider 215 has a lower voltage level than the source reference voltage SVREF. The driving element 213 may drive the driving voltage VDRV to the high voltage VPP_E based on the comparison pulse COMP. The driving element 213 may generate the driving voltage VDRV having a voltage level set as a preset voltage level rapidly and stably, by driving the driving voltage VDRV to the high voltage VPP_E, which has been set to have a higher voltage level than the power supply voltage VDD, when the comparison pulse COMP has a logic low level. The voltage divider 215 may include resistor elements 217_1 and 217_2, divide the driving voltage VDRV, and output a divided voltage to a node nd211. When the resistor elements 217_1 and 217_2 have the same resistance values, the voltage divider 215 may output, to the node nd211, a voltage having a voltage level set to be half the voltage level of the driving voltage VDRV.

Figure 4:
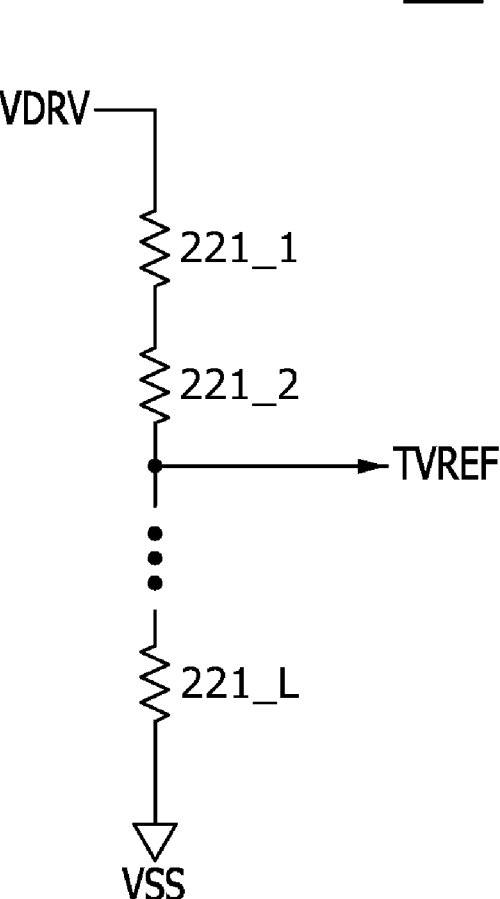
FIG. 4 is a circuit diagram according to an example of a temperature reference voltage generation circuit that is included in the temperature sensor of FIG. 2.

FIG. 4 is a circuit diagram of a temperature reference voltage generation circuit 25A according to an example of the temperature reference voltage generation circuit 25. As illustrated in FIG. 4, the temperature reference voltage generation circuit 25A may include the resistor elements 221_1 to 221_L that are connected in series between the driving voltage VDRV and the ground voltage VSS. The temperature reference voltage generation circuit 25A may generate the temperature reference voltage TVREF by dividing the driving voltage VDRV based on resistance values of the resistor elements 221_1 to 221_L.

FIG. 5 is a circuit diagram of a variable voltage generation circuit 27A according to an example of the variable voltage generation circuit 27. As illustrated in FIG. 5, the variable voltage generation circuit 27A may include resistor elements 231_1, 231_2, the NMOS transistor 233, the first trimming resistor 235_1, and the second trimming resistor 235_2. The resistor element 231_1 may be connected between the driving voltage VDRV and a node nd231. The first trimming resistor 235_1 may be connected between the node nd231 and the ground voltage VSS. A resistance value of the first trimming resistor 235_1 may be adjusted by the first trimming code TR_CD1. The gate voltage VG that is output from the node nd231 may be set based on a ratio of a resistance value of the resistor element 231_1 and a resistance value of the first trimming resistor 235_1, which is adjusted by the first trimming code TR_CD1. The voltage level of the gate voltage VG may be set so that the NMOS transistor 233 operates in the inversion area. Accordingly, when the sensing temperature is changed, the variable voltage VTEMP can be linearly changed. In the present embodiment, a gate source voltage VGS, that is, a voltage difference between the gate voltage VG and a voltage at the node nd233 that is connected to the source terminal of the NMOS transistor 233, may be set to 0.4 V to 0.6 V. The resistor element 231_2 may be connected between the driving voltage VDRV and a node nd232 from which the variable voltage VTEMP is output. The NMOS transistor 233 may be turned on by the gate voltage VG and may control the variable voltage VTEMP to be driven by the driving voltage VDRV. The second trimming resistor 235_2 may be connected between the node nd233 that is connected to the source terminal of the NMOS transistor 233 and the ground voltage VSS. A structure for a common source amplifier having a degeneration resistor is formed by the second trimming resistor 235_2 that is connected to the source terminal of the NMOS transistor 233. Accordingly, when the gate voltage VG of the NMOS transistor 233 is changed, the variable voltage VTEMP can be linearly changed. The variable voltage generation circuit 27A may perform the first trimming operation of adjusting the resistance value of the first trimming resistor 235_1 by the first trimming code TR_CD1 in order to adjust the voltage level of the gate voltage VG so that the NMOS transistor 233 that drives the variable voltage VTEMP operates in the inversion area. The variable voltage generation circuit 27A may perform the second trimming operation of adjusting, to the second trimming code TR_CD2, a resistance value of the second trimming resistor 235_2 that is connected to the node nd233 connected to the source terminal of the NMOS transistor 233. The variable voltage generation circuit 27A may adjust the ratio of the variable voltage VTEMP that is changed when the sensing temperature is changed by the second trimming operation. For example, as the resistance value of the second trimming resistor 235_2 is increased by the second trimming operation, the ratio of the variable voltage VTEMP that is changed when the sensing temperature is changed may be set to be decreased.

Figure 6:
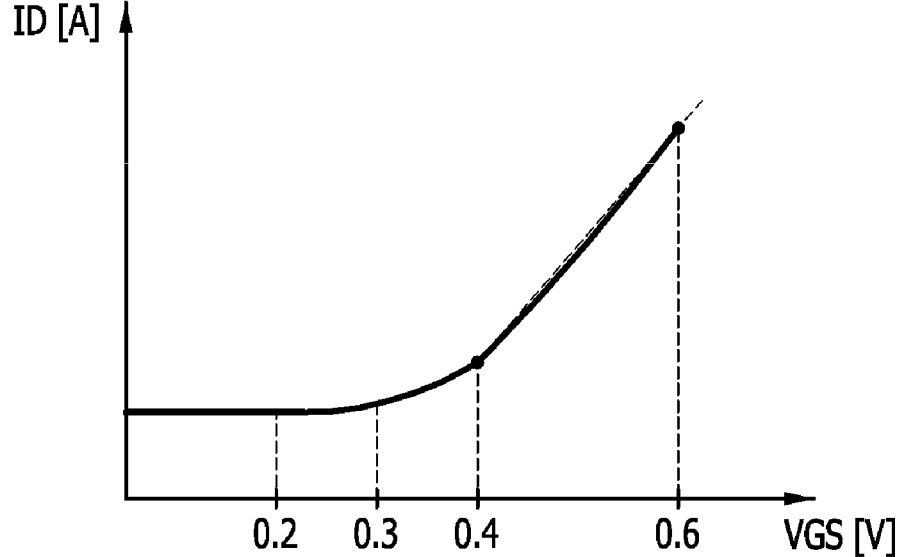
FIG. 6 is a graph illustrating an area in which a MOS transistor that drives a variable voltage operates in the variable voltage generation circuit illustrated in FIG. 5.

FIG. 6 is a graph illustrating an area in which the NMOS transistor 233 operates.

The NMOS transistor 233 may operate in another area based on the gate voltage VG. When the gate voltage VG is a flat band voltage or less, the NMOS transistor 233 may operate in a depletion area in which charges are accumulated on a boundary surface between metal and silicon. The flat band voltage may be set to a voltage capable of flattening an energy band of the NMOS transistor 233. When the gate voltage VG is higher than the flat band voltage, the NMOS transistor 233 may operate in the inversion area in which a channel is formed because the state in which metal and silicon have been doped is inverted. The inversion area may include a weak inversion area and a strong inversion area based on a degree that the state in which metal and silicon have been doped has been inverted. Referring to FIG. 6, when the gate source voltage VGS is 0.2 V to 0.3 V, the NMOS transistor 233 may operate in the depletion area. When the gate source voltage VGS is 0.4 V to 0.6 V, the NMOS transistor 233 may operate in the inversion area. It may be seen that as the gate source voltage VGS is changed when the NMOS transistor 233 operates in the inversion area, a change in the drain current ID of the NMOS transistor 233 may be linearly increased. More specifically, when the NMOS transistor 233 operates in the inversion area rather than the depletion area, a change in the drain current ID for a change in the gate source voltage VGS may be increased. When the gate source voltage VGS is changed, the drain current ID may be linearly changed.

Figure 7:
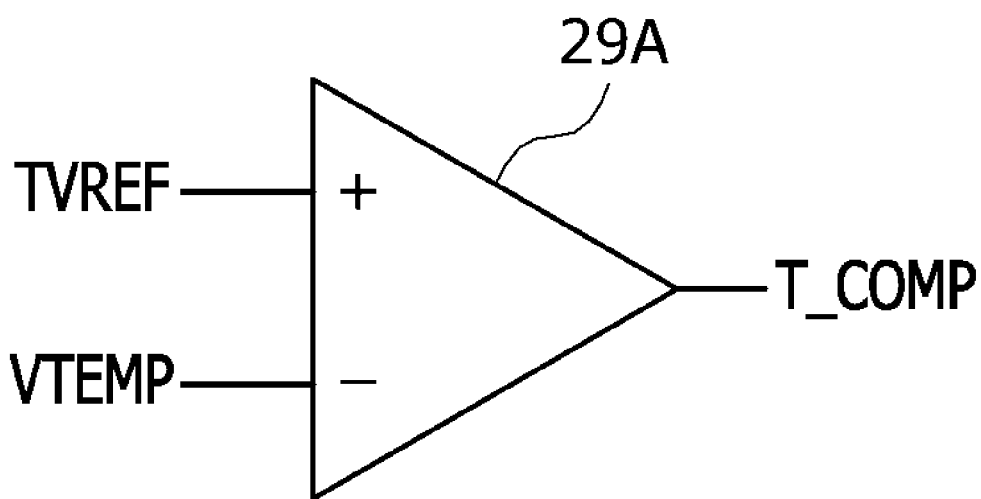
FIG. 7 is a circuit diagram according to an example of a temperature sensing signal generation circuit that is included in the temperature sensor of FIG. 2.

FIG. 7 is a circuit diagram of a temperature sensing signal generation circuit 29A according to an example of the temperature sensing signal generation circuit 29. As illustrated in FIG. 7, the temperature sensing signal generation circuit 29A may receive the temperature reference voltage TVREF through a positive terminal "+" of the temperature sensing signal generation circuit 29A and may receive the variable voltage VTEMP through a negative terminal "−" of the temperature sensing signal generation circuit 29A. The temperature sensing signal generation circuit 29A may generate the temperature sensing signal T_COMP by comparing the temperature reference voltage TVREF with the variable voltage VTEMP. The temperature sensing signal generation circuit 29A may generate the temperature sensing signal T_COMP having a logic level set based on a result of the comparison between the temperature reference voltage TVREF and the variable voltage VTEMP.

FIG. 8 is a table for describing an operation of the temperature sensing signal generation circuit 29A. As illustrated in FIG. 8, the temperature sensing signal generation circuit 29A may generate the temperature sensing signal T_COMP having a logic level set at a logic high level "H" when the variable voltage VTEMP has a voltage level equal to or lower than the voltage level of the temperature reference voltage TVREF and may generate the temperature sensing signal T_COMP having a logic level set as a logic low level "L" when the variable voltage VTEMP has a higher voltage level than the temperature reference voltage TVREF.

The embodiments of the present disclosure have been described so far. A person having ordinary knowledge in the art to which the present invention pertains will understand that the present invention may be implemented in a modified form without departing from an intrinsic characteristic of the present disclosure. Accordingly, the disclosed embodiments should be considered from a descriptive viewpoint, not from a limitative viewpoint. The range of the present disclosure is described in the claims not the aforementioned description, and all differences within an equivalent range thereof should be construed as being included in the present disclosure.

What is claimed is:

1. A temperature sensor comprising:
a first trimming resistor having a first resistance value that is trimmed based on a first trimming code and configured to adjust a gate voltage;
a MOS transistor turned on based on the gate voltage and configured to drive a variable voltage having a voltage level set for each sensing temperature; and
a second trimming resistor connected to the MOS transistor, the second trimming resistor having a second resistance value that is trimmed based on a second trimming code,
wherein the first trimming resistor is connected between a ground voltage and a node from which the gate voltage is output.

2. The temperature sensor of claim 1, wherein the first resistance value is trimmed in response to the first trimming code, a logic bit set of which is set based on whether fuses have been.

3. The temperature sensor of claim 1, further comprising a first resistor element that is connected between the node and a driving voltage.

4. The temperature sensor of claim 3, further comprising a driving voltage regulator configured to drive the driving voltage to a high voltage based on a result of a comparison between a source reference voltage and a voltage generated by dividing the driving voltage.

5. The temperature sensor of claim 4, wherein the driving voltage regulator drives the driving voltage to the high voltage that is set to have a higher voltage level than a power supply voltage.

6. The temperature sensor of claim 5,
wherein the MOS transistor comprises an NMOS transistor, and
wherein the variable voltage is output through a drain terminal of the NMOS transistor.

7. The temperature sensor of claim 6, further comprising a second resistor element that is connected between the drain terminal of the NMOS transistor and the driving voltage.

8. The temperature sensor of claim 1, wherein the second resistance value is trimmed in response to the second trimming code, a logic bit set of which is set based on whether fuses have been cut.

9. The temperature sensor of claim 1, wherein the second trimming resistor is connected between a source terminal of the MOS transistor and a ground voltage.

10. The temperature sensor of claim 1, wherein the second trimming resistor operates as a degeneration resistor for a common source amplifier comprising the MOS transistor.

11. The temperature sensor of claim 1, further comprising a temperature sensing signal generation circuit configured to generate a temperature sensing signal based on the variable voltage and a temperature reference voltage that is generated by dividing a driving voltage.

12. A temperature sensor comprising:
a driving voltage regulator configured to drive a driving voltage to a high voltage based on a result of a comparison between a source reference voltage and a voltage generated by dividing the driving voltage;
a variable voltage generation circuit comprising a MOS transistor that drives a variable voltage based on the driving voltage, the variable voltage generation circuit configured to:
perform a first trimming operation of adjusting a resistance value of a first trimming resistor in order to adjust a voltage level of a gate voltage of the MOS transistor; and
perform a second trimming operation of adjusting a resistance value of a second trimming resistor that is connected to the MOS transistor; and
a temperature sensing signal generation circuit configured to generate a temperature sensing signal based on the variable voltage and a temperature reference voltage that is generated by dividing the driving voltage.

13. The temperature sensor of claim 12, wherein the driving voltage regulator drives the driving voltage to the high voltage that is set to have a higher voltage level than a power supply voltage.

14. The temperature sensor of claim 12,
wherein the variable voltage generation circuit comprises the first trimming resistor that is connected between a ground voltage and a node from which the gate voltage is output, and wherein the resistance value of the first trimming resistor is trimmed in response to a first trimming code, a logic bit set of which is set based on whether fuses have been cut.

15. The temperature sensor of claim 14, wherein the variable voltage generation circuit further comprises a resistor element that is connected between the node and the driving voltage.

16. The temperature sensor of claim 12,
wherein the variable voltage generation circuit comprises the second trimming resistor that is connected between a source terminal of the MOS transistor and a ground voltage, and
wherein the resistance value of the second trimming resistor is trimmed in response to a second trimming code, a logic bit set of which is set based on whether fuses have been cut.

17. The temperature sensor of claim 12, wherein the second trimming resistor operates as a degeneration resistor for a common source amplifier comprising the MOS transistor.

18. An electronic system comprising:
an external device configured to generate and output a first trimming code and a second trimming code, a logic bit set of each being set based on whether fuses included in the external device have been cut; and
a temperature sensor comprising a MOS transistor that drives a variable voltage based on a driving voltage, the temperature sensor configured to:
perform a first trimming operation of adjusting a resistance value of a first trimming resistor based on the first trimming code in order to adjust a voltage level of a gate voltage of the MOS transistor,
perform a second trimming operation of adjusting a resistance value of a second trimming resistor that is connected to the MOS transistor based on the second trimming code, and
generate a temperature sensing signal based on the variable voltage and a temperature reference voltage, wherein the first trimming resistor is connected between a ground voltage and a node from which the gate voltage is output.

19. The electronic system of claim 18, wherein the temperature sensor further comprises a driving voltage regulator configured to drive the driving voltage to a high voltage based on a result of a comparison between a source reference voltage and a voltage generated by dividing the driving voltage.

* * * * *